Patented Aug. 12, 1930

1,773,000

UNITED STATES PATENT OFFICE

FREDERICK W. HUBER, OF RIVERSIDE, CALIFORNIA

MAKING ROADS

No Drawing.   Application filed August 24, 1928.   Serial No. 301,947.

The present invention relates to the production of roads, under which term I include not only the central portion of a roadway, where vehicles run, but also sidewalks, gutters, private roadways or walks, floors, roofs, and the like.

In my copending application filed August 7, 1928, Serial No. 298,132, I have described and claimed the addition of a particular emulsion to cement, cement mortar, dry cement for making mortar, and the like, the emulsion in question being one in which oil constitutes the continuous phase, and a solution of an electrolyte constituting an accelerator for cement, as the disperse phase. The electrolyte may consist of calcium chloride, or other alkaline earth chloride or other soluble salt of an alkaline earth capable of acting as an accelerator, or an acid which when added to cement will react with some of the free lime present to produce such a soluble salt. Other electrolytes such as sodium carbonate can also be employed.

As the result of this process, the cement mortar, cement grout or cement concrete is waterproofed by the oil, the cement after hydrating becomes hard within a short period, and acquires high strength even within a few days. As an example of execution of the process, an emulsion is prepared containing crude California oil as the continuous phase, and containing an equal amount of a 30 or 40% solution of calcium chloride.

2% of this emulsion was mixed with Portland cement, sand and water added, and the materials were then thoroughly mixed together and made into the desired shapes. The articles so produced were allowed to harden, being observed from time to time. After three days it ways found that the compressive strength of the molded products was about equal to the strength of molded products of the same composition, but without the emulsion, which had stood for a period of three weeks. In computing the 2% of emulsion, the amount of the dry Portland cement is taken as 100%.

The use of this emulsion in the making up of cement, sand and stone mixtures (concrete) for the manufacture of roads is thought to be an important advance in the art of building roads. On account of the waterproofing properties of the emulsion, the roads will be waterproofed, and due to that fact, they will not absorb and give up water, and accordingly there will be very little expansion and contraction of the completed road, so that the road will not become broken from that source. There are many other advantages of using the oil emulsion in the construction of concrete roads. First of all the flowability of the mixture is excellent, whereby the amount of labor necessary for putting down the moistened concrete is reduced to a minimum. It gives a water-tight wearing surface, which is capable of being further treated with a "carpet" wearing surface, which may be composed of any of the materials commonly used for this purpose. An important advantage is the fact that the hardening is so much accelerated, that the road may be opened up for traffic in a small fraction of the time now usually required. In this connection it is noted that after laying a cement road, it is customary to divert traffic for about three weeks after the road has been completed, in order to allow the cement to harden sufficiently to stand heavy traffic, without breaking up.

In accordance with the present invention the road can safely be opened up to traffic in about three or four days after the completion of the work.

For the making of the wet concrete, I may employ varying amounts of the emulsion referred to, for example I may use from 2% or less up to 4% or even 5% if desired. In some cases 1% or 1.5% is sufficient. The emulsion can be mixed into the concrete during the making of the concrete, or if desired the emulsion can be added to and absorbed by the dry Portland cement, before the same is used for making the concrete, and in some cases it is even advisable to add this to the dry cement, at the time of bagging up the same in the cement factory.

I have referred above to the use of high concentrated solutions of calcium chloride such as saturated solutions. A saturated solution of calcium chloride, at ordinary atmospheric temperature may contain as much as 40%, and for use in the present process I find that solutions of about 30% are very advantageous to use in the process, these solutions (when emulsified in the oil) being stable at all ordinary temperatures, and the emulsions made therefrom being also quite stable so that they can be kept for a long time.

Without restricting the invention thereto, I give the following as an example of the preparation of the emulsion:—

As emulsifying agent I prefer to use the residue resulting from the cracking of crude petroleum by the "Dubbs" process, this material is a rather viscous tar-like complex known as "Dubbs sludge." To the crude petroleum to be used in making the emulsion I add about 1% of this Dubbs sludge and thoroughly mix.

While this mixture is being maintained in vigorous agitation, I add to it a more or less concentrated (preferably nearly saturated) aqueous solution of any of the inorganic salts above described which can act as excitors or accelerators in predetermined amount and continue the agitation until a seemingly uniform liquid results. In the emulsion so produced oil is the external phase and the aqueous excitor solution the internal. Very stable emulsions result which are not much more viscous than the crude oil used in forming them, in which as much as 4 parts saturated excitor solution can be made to disperse in one part of oil, yet the oil constitutes the external or continuous phase. For many purposes 1 part of the oil to 1 part of the $CaCl_2$ solution is a satisfactory ratio.

I have referred above to the use of calcium chloride more particularly as the excitor, but various other excitors (or accelerators) can be employed as above indicated. Practically any soluble salt of a mineral acid with an alkaline earth metal, and practically any mineral acid which will react with the lime or some of the lime in the cement to produce a soluble salt can be used, as well as numerous alkali metal salts which are soluble and which are known to be excitors. Mixtures of such materials of course can also be employed. In addition to the calcium chloride and hydrochloric acid above referred to, calcium nitrate, nitric acid, ammonium chloride, sodium or potassium carbonate and the like are all satisfactory for the purpose, but calcium chloride is cheap and highly efficient for the purpose.

I have herein referred to the use of Portland cement as the cement material, which is the preferred cement for road construction. However I call attention that various other hydraulic cements can be likewise employed. The use of stone in the concrete is generally advisable from the standpoint of cost, but this can be omitted. Metal reinforcements can also be used, if desired.

I claim:—

1. A process of making roads which comprises mixing road-making materials containing hydraulic cement, water and aggregate, and containing a few percent of an emulsion containing petroleum oil as the continuous phase, and containing an aqueous electrolyte as the disperse phase, such electrolyte being one that is capable of leaving a soluble alkaline earth metal salt in such mixture, spreading such entire mixture into the form of a road bed, compacting the same and allowing it to set and harden, whereby the mixture becomes sufficiently hard and strong within a few days to be opened to traffic, and whereby the oil waterproofs the road.

2. A process of making roads which comprises mixing road-making materials containing hydraulic cement, water and aggregate, and containing a few percent of an emulsion containing petroleum oil as the continuous phase, and containing an aqueous electrolyte as the disperse phase, such electrolyte being one that is capable of leaving calcium chloride, in such mixture, spreading such entire mixture into the form of a road bed, compacting the same and allowing it to set and harden, whereby the mixture becomes sufficiently hard and strong within a few days to be opened to traffic, and whereby the oil waterproofs the road bed.

3. A process of making roads which comprises mixing road-making materials containing hydraulic cement, water and aggregate, and containing a few percent of an emulsion containing petroleum oil as the continuous phase, and containing an accelerator in aqueous solution as the disperse phase, spreading such entire mixture into the form of a road bed, compacting the same and allowing it to set and harden whereby the oil waterproofs the road bed, and opening the road to traffic within a few days after the cement concrete is laid.

4. In the manufacture of hydraulic-cement-bound roads, the improvement which comprises applying to hydraulic cement an emulsion having oil as its continuous phase and having an accelerator in aqueous solution as its disperse phase, and thoroughly mixing such materials with aggregate of road-building sizes in the presence of sufficient water to hydrate the cement and spreading the mixture in a road foundation.

In testimony whereof I affix my signature.

FREDERICK W. HUBER.